US006637797B2

(12) United States Patent
Baik

(10) Patent No.: US 6,637,797 B2
(45) Date of Patent: Oct. 28, 2003

(54) TRUNK LID SUPPORT DEVICE FOR AN AUTOMOBILE

(75) Inventor: In-Sun Baik, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/187,553

(22) Filed: Jul. 1, 2002

(65) Prior Publication Data

US 2003/0006622 A1 Jan. 9, 2003

(30) Foreign Application Priority Data

Jul. 7, 2001 (KR) ........................................ 2001-40656

(51) Int. Cl.[7] ................................................ B62D 25/10
(52) U.S. Cl. ......................................................... 296/76
(58) Field of Search ......................... 296/76, 56, 146.11, 296/202

(56) References Cited

U.S. PATENT DOCUMENTS

| | | | | | |
|---|---|---|---|---|---|
| 2,594,643 | A | * | 4/1952 | Gustisha | 296/76 |
| 4,125,170 | A | * | 11/1978 | Botz | 296/76 |
| 4,391,379 | A | | 7/1983 | Paffrath | |
| 4,688,844 | A | | 8/1987 | Hirose et al. | |
| 4,776,626 | A | * | 10/1988 | Seyler | 296/76 |
| 5,050,270 | A | | 9/1991 | Burgei et al. | |
| 5,243,738 | A | | 9/1993 | Kiefer | |
| 5,788,312 | A | * | 8/1998 | Lee | 296/76 |
| 6,029,941 | A | | 2/2000 | Mayzes | |
| 6,030,023 | A | | 2/2000 | Guillez | |
| 6,059,346 | A | | 5/2000 | Moon | |
| 6,092,335 | A | | 7/2000 | Queveau et al. | |
| 6,181,094 | B1 | | 1/2001 | Menke | |
| 2002/0084668 | A1 | * | 7/2002 | Yamagishi et al. | 296/76 |

OTHER PUBLICATIONS

US patent application, Publication No. US2001/5920, Jul. 5, 2001, Kim.

* cited by examiner

*Primary Examiner*—D. Glenn Dayoan
*Assistant Examiner*—Lori L. Coletta
(74) *Attorney, Agent, or Firm*—Pennie & Edmonds LLP

(57) ABSTRACT

A trunk lid support device for an automobile, wherein, without great change to the gas pressure of a gas lifter according to the prior art and without big structural modification, the moment force provided by the gas lifter in a maximally open state of the trunk lid can be greatly formed compared with the prior art, to thereby enable to embody a smooth operability and stable open state of the trunk lid. The device comprises a gooseneck member, one end of which is connected to a trunk lid while the other end is connected to an automobile body via a first hinge, and a gas lifter, one end of which is connected to the automobile body via a second hinge while the other end is connected to a predetermined position of the gooseneck member via a third hinge, wherein the other end of the gas lifter is connected to the gooseneck member so that the vertical distance from the first hinge to the gas lifter when the trunk lid is fully opened is longer than the vertical distance from the first hinge to the gas lifter when the trunk lid is closed.

5 Claims, 3 Drawing Sheets

TRUNK LID SUPPORT DEVICE FOR AN AUTOMOBILE

FIELD OF THE INVENTION

The present invention relates to a trunk lid of an automobile, and more particularly, to a trunk lid support device for an automobile constructed to enable the trunk lid to be maintained in a stable open state.

BACKGROUND OF THE INVENTION

Generally, a passenger car is equipped with a trunk at the rear side for storing spare tires and the like. The trunk is composed of a predetermined space for accommodating articles, a trunk lid for enclosing the predetermined space, and a locking device.

As shown in FIG. 1, the trunk lid is supported by the car body (B), and the trunk lid (T) is connected at one end to a gooseneck member 5. The gooseneck member 5 is coupled to the car body (B) via a first hinge 10 such that when the trunk lid (T) is pivoted via the first hinge 10, the trunk may be opened and closed.

As shown in FIG. 2, between the gooseneck 5 and the car body (B) there is a gas lifter (L) for smoothing the opening and closing operation of the trunk lid (T). The gas lifter (L) also serves to prevent the trunk lid (T) from bobbing up and down or engaging in a jerky movement from an open position to a closed position by using a predetermined force.

However, there is a problem in the conventional mechanism thus described. Power for the gas lifter (L) to support the trunk lid (T) weakens when the trunk lid (T) is opened, thus being unable to stably support the open state of the trunk lid (T), which causes the trunk lid (T) to close or vibrate by itself. Particularly, when the temperature drops down in the winter season, gas filled in the gas lifter (L) drops in pressure to further weaken the power that supports the trunk lid (T), often causing the trunk lid (T) to close by itself, potentially causing injury to a user. One of the ways to solve the aforementioned problem is to increase gas pressure in the gas lifter (L), but this causes another problem in that pressure increase in the gas lifter (L) abruptly opens the trunk lid (T) to make movement of the trunk lid (T) unstable. There is another problem in that more power is needed to close the trunk lid (T), which may cause inconvenience to a user.

As shown in FIG. 3, the length of a vertical line (R1) extending from the lengthwise extending line of the gas lifter (L) to the first hinge 10 while the trunk lid (T) is closed represents the length of the moment arm for calculating the torque provided by the gas lifter (L) when the trunk lid (T) starts to open. Likewise, the length of vertical line (R2) extending from the lengthwise extending line of the gas lifter (L) to the first hinge 10 when the trunk lid (T) is maximally opened represents the length of the moment arm for calculating the torque provided by the gas lifter (L) in order to support the open state of the trunk lid (T). If the two lengths of the moment arms (R1 and R2) are compared therebetween, the length of moment arm (R1) when the trunk lid (T) is closed is slightly longer than the length of the moment arm (R2) when the trunk lid (T) is maximally opened.

It should be apparent that the force provided to the trunk lid (T) by the gas lifter (L) is stronger when the trunk lid (T) is closed than when the trunk lid (T) is opened. Although it is natural to consider the characteristics of the gas in the gas lifter (L), it should be assumed that the same force is applied when the trunk lid (T) is in a closed and open state for the sake of easy interpretation, such that it can be noticed that the force supplied by the gas lifter (L) and the moment arm (R2) in the open state of the trunk lid (T) is smaller than the moment force supplied by the gas lifter (L) and the moment arm (R1) in a closed state of the trunk lid (T). In other words, assuming that the same amount of power is applied, the magnitude of the moment force is proportional to the length of the moment arm applied with the power, such that, even if the same amount of power is applied to the gas lifter (L), less moment force is received when the trunk lid (T) is opened than when the trunk lid (T) is closed, the moment force being formed by the power applied from the gas lifter (L).

In view of the aforesaid drawbacks, it would be desirable to provide a trunk lid support device using the gooseneck member 5 and the gas lifter (L) with more power applied to support the opened state of the trunk lid (T).

SUMMARY OF THE INVENTION

The present invention provides a trunk lid support device for an automobile adapted to further increase the moment force formed by the power supplied from a gas lifter in a state where a trunk lid is maximally opened without increasing the gas pressure of the gas lifter and without significant change to the existing structure, thus ensuring a stable open state of the trunk lid.

According to one embodiment of the invention, the device comprises a gooseneck member, one end of which is connected to a trunk lid while the other end is coupled to an automobile body via a first hinge. A gas lifter has a first end coupled to the automobile body via a second hinge and a second end coupled at a predetermined position to the gooseneck member via a third hinge. The second end of the gas lifter is coupled to the gooseneck member so that the vertical distance from the first hinge to the gas lifter when the trunk lid is fully open is longer than the vertical distance from the first hinge to the gas lifter when the trunk lid is closed.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
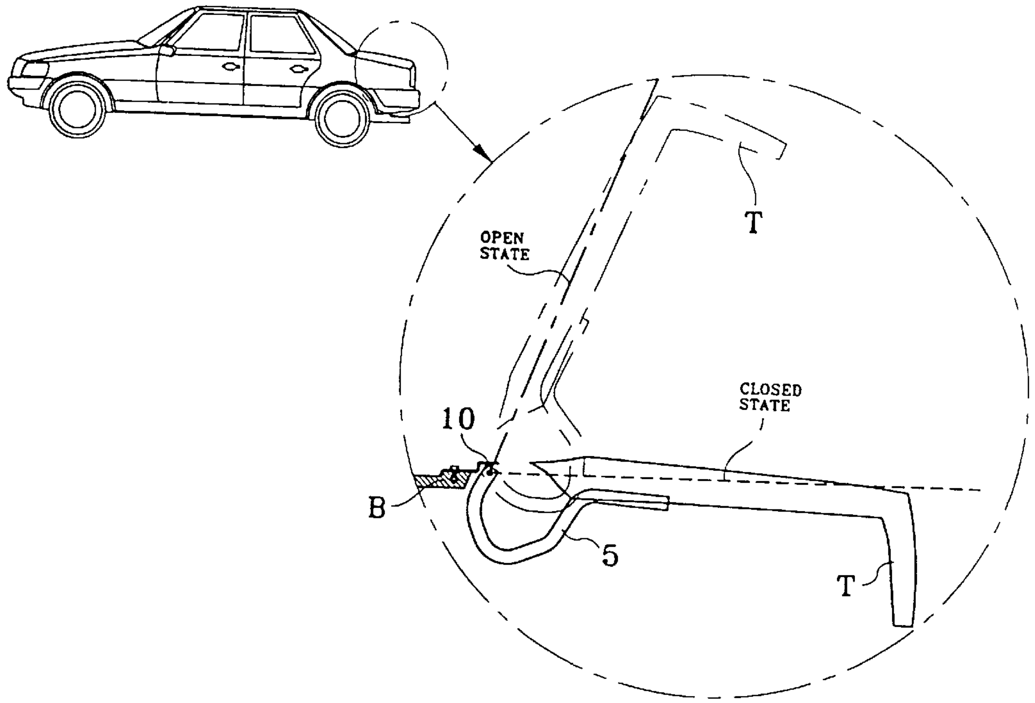
FIG. 1 (Prior art)
FIG. 1 is a schematic view of an open/closed system of a vehicular trunk according to the prior art.
Figure 2:
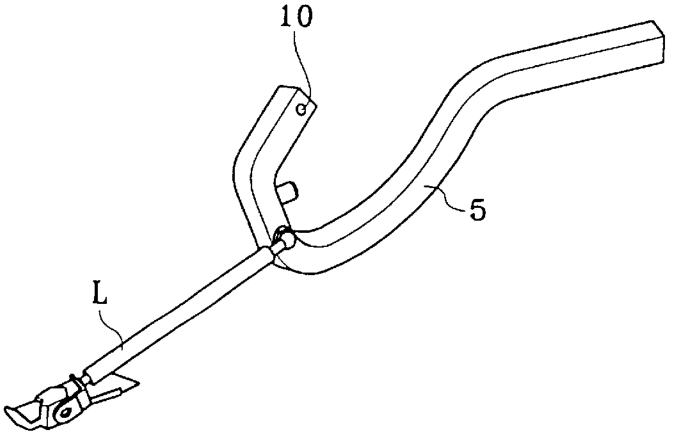
FIG. 2 (Prior art)
FIG. 2 is a perspective view of a trunk lid support device for an automobile according to the prior art.
Figure 3:
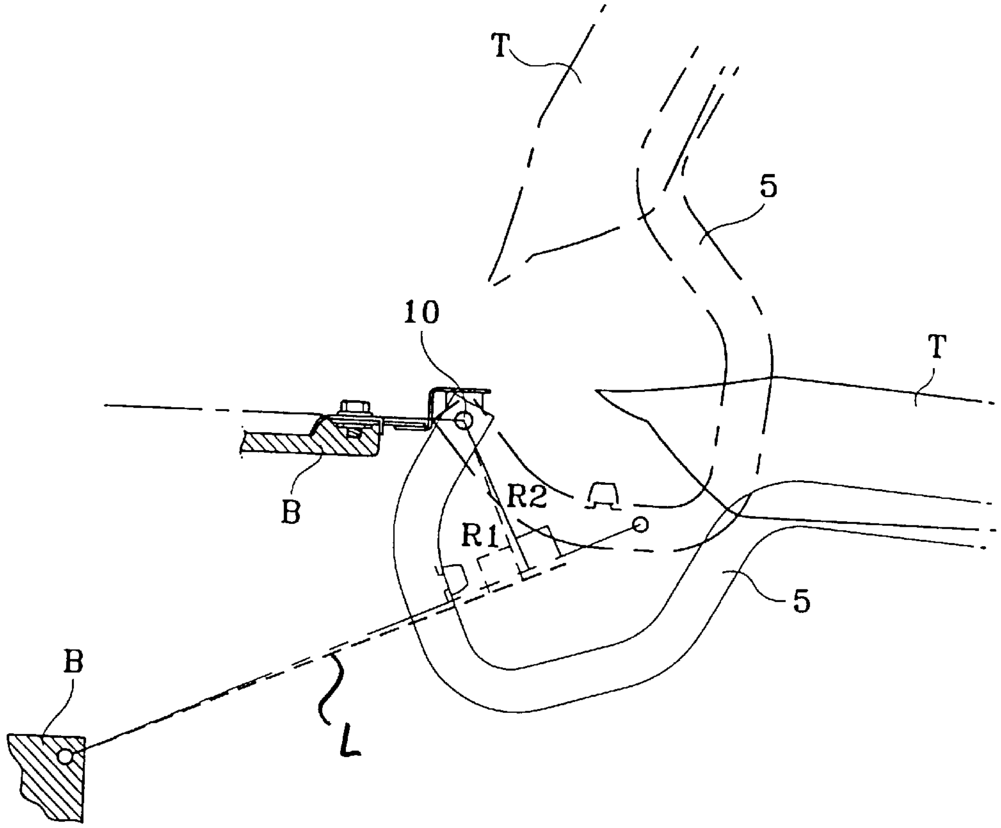
FIG.3 (Prior art)
FIG. 3 is a schematic view illustrating the differences between an open state and a closed state of a trunk lid support device according to the prior art.

Hereinafter, a detailed description of the present invention will be described with reference to the accompanying drawings. Throughout the drawings, like reference numerals are used for designation of like or equivalent parts or portions as in the prior art for simplicity of illustration and explanation.

Figure 4:
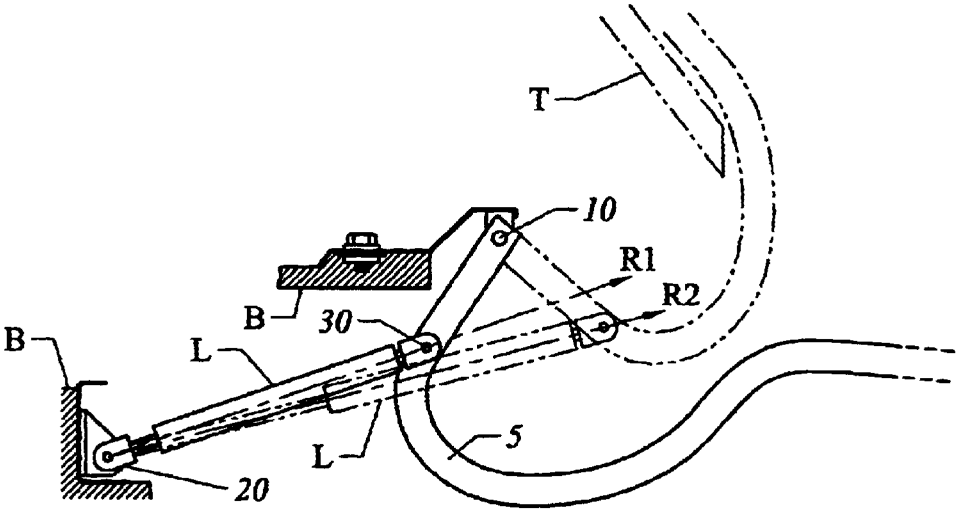
FIG. 4 is a schematic view illustrating the differences between an open state and a closed state of a trunk lid support device according to the present invention.

As shown in FIG. 4, a trunk lid (T) is connected to a vehicular body (B) via a gooseneck member 5 as in the prior art (FIG. 1). The gooseneck member 5 is secured at one end to the trunk lid (T) while the other end of the gooseneck member 5 is coupled to the vehicular body (B) via a first hinge 10 such that an open/closed operation of the trunk lid (T) is accomplished by rotation of the trunk lid (T) via the first hinge 10 as a rotating axle. A gas lifter (L) is coupled at a predetermined position to the gooseneck member 5, whereby the trunk lid (T) is easily and smoothly opened by force provided by the gas lifter (L). When the trunk lid (T) is maximally opened, the trunk lid (T) maintains its open state unless it is manually manipulated by a user. The gas lifter may be a piston or other lifting member used to apply a force to the gooseneck member to open or close the trunk.

The gas lifter (L) is coupled at one end to the vehicular body (B) via a second hinge 20 while the other end of the gas lifter (L) is coupled at a predetermined position to the gooseneck member 5 via a third hinge 30 so that the vertical distance from the first hinge 10 to the gas lifter (L) is longer when the trunk lid (T) is maximally opened than when in the closed state. In other words, assuming that the force provided by the gas lifter (L) when the trunk lid (T) is closed is the same as when the trunk lid (T) is maximally opened, the length of moment arm is extended to a maximum open state of the trunk lid to allow formation of a large moment force in an open state of the trunk lid (T). Consequently, as shown in FIG. 4, the moment arm (R2) in an open state of the trunk lid (T) is longer than the moment arm (R1) in a closed state of the trunk lid (T). As a result, when the gas lifter (L) is mounted as in the aforementioned fashion, the gas lifter (L), lifts the trunk lid (T) from the closed state in a natural and stable manner to open the trunk. Once the trunk lid (T) is maximally opened, the trunk lid (T) can maintain a stable opened state through the combination of the force provided by the gas lifter (L) and the extended length of the moment arm.

As apparent from the foregoing, there is an advantage in the trunk lid support device for an automobile thus described according to the present invention in that the moment force provided by the gas lifter and moment arm in a maximally open state of the trunk lid can be greatly increased compared with the prior art to enable smooth operability and a stable open state of the trunk lid.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A trunk lid support device for an automobile, the device having a gooseneck member, one end of which is connected to a trunk lid while the other end is coupled to an automobile body via a first hinge, and a gas lifter, one end of which is coupled to said automobile body via a second hinge while the other end is connected to a predetermined position of the gooseneck member via a third hinge, wherein said other end of the gas lifter is connected to the gooseneck member so that the vertical distance from the first hinge to the gas lifter when the trunk lid is fully opened is longer than the vertical distance from the first hinge to the gas lifter when the trunk lid is closed.

2. A trunk support device for an automobile, comprising:

a gooseneck member having a first end adapted to be connected to a trunk lid and a second end adapted to be coupled to an automobile body via a first hinge; and a lifting member, a first end of which is adapted to be coupled to said automobile body via a second hinge and a second end which is coupled at a predetermined position to said gooseneck member via a third hinge, wherein said second end is coupled to said gooseneck member so that the vertical distance from said first hinge to said lifting member when trunk lid is fully opened is longer than the vertical distance from said first hinge to said lifting member when said trunk lid is closed.

3. A trunk lid support device, comprising:

a gooseneck member with a first end and a second end wherein said first end is rotatingly coupled to an automobile body;

a trunk lid fixed to said second end of said gooseneck member; and a lifting member coupled to said gooseneck member;

wherein:

said lifting member applies a constant force to said gooseneck member to create a moment force acting about said first end of said gooseneck member; and said moment force reaches a maximum when said trunk lid is fully open.

4. The trunk lid support device of claim 3, wherein said lifting member is a gas pressurized lifter.

5. The trunk lid support device of claim 4, wherein the lifting member is coupled to the gooseneck at a point defining a moment arm with respect to a pivot point of the trunk lid, said moment arm being longer in an open position of the trunk lid than in a closed position.

* * * * *